S. L. McADAMS.
LUBRICATING LOOSE PULLEY AND POWER TRANSMITTING DEVICE.
APPLICATION FILED AUG. 27, 1910.
1,125,357.
Patented Jan. 19, 1915.
2 SHEETS—SHEET 1.
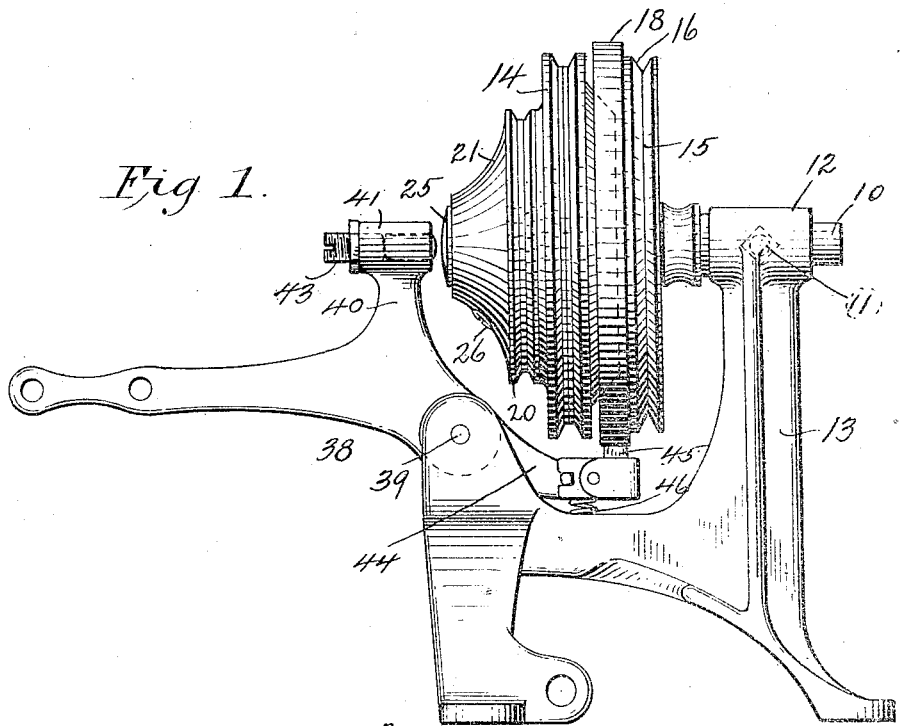
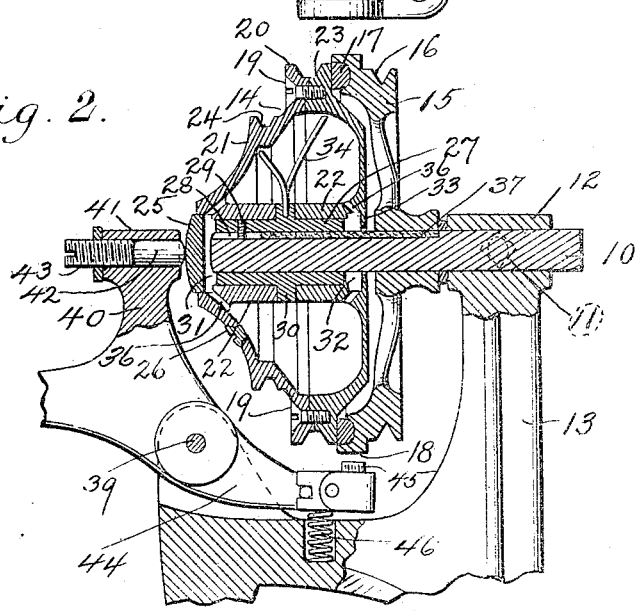

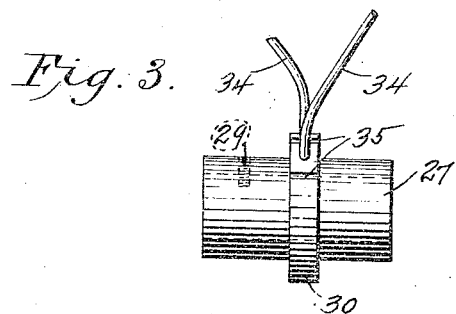
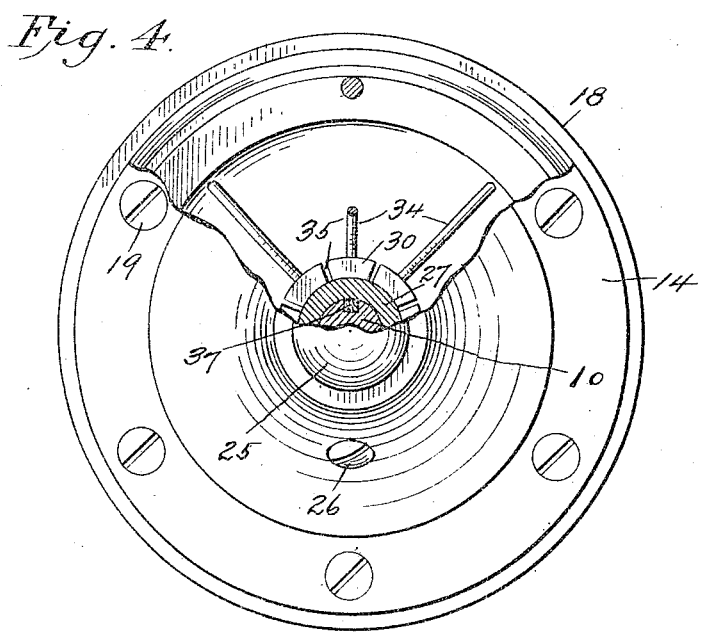

UNITED STATES PATENT OFFICE.

SYLVESTER L. McADAMS, OF CLEVELAND, OHIO, ASSIGNOR, BY MESNE ASSIGNMENTS, TO H. R. LOOMIS, TRUSTEE.

LUBRICATING LOOSE PULLEY AND POWER-TRANSMITTING DEVICE.

1,125,357.

Specification of Letters Patent.

Patented Jan. 19, 1915.

Application filed August 27, 1910. Serial No. 579,276.

*To all whom it may concern:*

Be it known that I, SYLVESTER L. MC-ADAMS, a citizen of the United States, residing at Cleveland, in the county of Cuyahoga and State of Ohio, have invented a certain new and useful Improvement in Lubricating Loose Pulleys and Power-Transmitting Devices, of which the following is a full, clear and exact description.

This invention relates to loose wheels or pulleys and particularly to features of construction relating to bearing lubrication.

In another aspect the invention relates to a power transmitting device including a pair of loose pulleys which are adapted to be shifted into frictional engagement, together with means whereby both pulleys are effectively lubricated.

One of the objects of the invention is to provide a wheel or loose pulley adapted to rotate freely on a spindle or bearing and constituting an oil inclosure which is constructed with the view of obtaining good lubrication and to prevent escape of the lubricant along the spindle or at the spindle opening or openings.

A further object is to provide a self-oiling loose pulley which is especially adapted for use in combination with a second loose pulley to form a power transmitting device, the one pulley serving not only as a self-oiler but as a container for oil which may be fed along the spindle on which the pulleys are mounted to lubricate the second pulley without any danger of oil escaping from the spindle opening and being spattered or thrown out.

These and other objects are accomplished by my invention which may be briefly summarized as consisting in certain novel details of construction and combinations and arrangements of parts to be described in the specification and set forth in the appended claims.

In the drawings, I have shown my invention embodied in a power transmitting device, but it will be understood that the main features are capable of other and more general uses.

In the drawings, Figure 1 is a side elevation of the power transmitting device constructed in accordance with my invention; Fig. 2 is a partial vertical sectional view of the same with the two pulleys in frictional engagement. Fig. 3 is a side elevation of the bearing member and oil conveyers forming part of the self-oiling loose pulley; and Fig. 4 is an end view of the self-oiling pulley with portions broken away.

Referring now to the figures of the drawing, 10 represents a stationary spindle which is fixed by a set screw 11 in the hub or boss 12 of a suitable bracket 13 adapted to be bolted to any suitable support. Rotatably mounted upon the spindle are two pulleys 14 and 15 which are adapted to be shifted into frictional engagement so that power applied to one pulley will be transmitted to the other. Preferably the pulley 15 will be connected by a belt to the driven machinery and the pulley 14 will be connected by a belt to a source of power, such as a shaft or motor. The pulley 15 is in this case mounted for rotary movement only and is provided with a V-shaped belt groove 16 and on one of its side faces with an annular groove in which is seated frictional material 17 adapted to be engaged by the side face of the pulley 14 so as to cause the two pulleys to be driven in unison. The pulley 15 is also provided with an annular frictional surface 18 adapted to be engaged by a brake member to be referred to presently.

The pulley 14 is composed of two halves or sections which are connected by a rabbeted joint and are secured together by screws 19. This pulley includes a rim portion 20, inwardly extending side portions 21, and hub portions 22 which extend inward longitudinally toward each other from the side portions, the inner ends of these hubs being spaced a short distance apart for a purpose to be referred to presently. This pulley is also provided with two V-shaped belt grooves 23 and 24, either of which may be engaged by a driving belt. In this case the spindle extends merely into the pulley and not directly through the same, one of the side portions having a spindle opening to be referred to presently, and the other having an opening corresponding to a spindle opening but preferably closed by a plug 25, the center of which is in line with the spindle axis. Therefore, except for the spindle opening in one of its side portions the pulley 14 is entirely closed and constitutes an oil inclosure, the oil being adapted to be admitted to the interior of the pulley through an opening normally closed by a screw plug 26.

The pulley 14 is mounted upon a bearing portion or bearing member 27 consisting in this case of a sleeve which is held from rotary movement on the spindle, but is preferably permitted to have a slight axial movement. In some of the appended claims, this part 27 is referred to as a sleeve, and in other claims as a bearing member. For this purpose, and for a further reason to be referred to presently, the spindle is provided with an axial or longitudinally extending key way or slot 28, which preferably extends along the spindle to the end of the bearing for the pulley 15. The sleeve is held from rotation on the spindle and is permitted to have the longitudinal movement by means of a key 29, in this case in the form of a screw which passes through the sleeve and enters the key way 28. This sleeve is engaged by the hubs 22 of the pulley and between the hubs 22 the sleeve is provided with an annular flange 30 which may be loosely engaged by the inner ends of the hubs with the result that the pulley 14 may rotate on the sleeve, but the pulley and sleeve will both move longitudinally of the spindle when the pulley 14 is shifted.

Between the plug 25 and the end of the spindle and corresponding end of the sleeve 27 is an oil recess or pocket 31 and at the opposite side of the pulley is an oil recess or pocket 32 which surrounds the spindle and is formed between the corresponding end of the sleeve 27 and a flange 33 which projects inwardly from the side portion of the pulley beyond the corresponding hub 22 toward the spindle. This flange 33 does not engage the spindle, but the spindle opening is purposely made larger than the spindle so as to avoid the leakage or escape of oil through the spindle opening as would take place if the inner edge of the flange engaged the spindle.

It will be seen that when the pulley 14 is rotated, the oil contained therein will be thrown outwardly against the periphery by centrifugal force. In order, however, that the bearing or bearing surfaces may be well lubricated, I employ oil conveyers 34 consisting in this case of wires which are secured or seated in sockets of the flange 30 and extend outwardly from said flange, toward and adjacent the periphery of the pulley. The oil conveyers or wires are preferably staggered or bent laterally in opposite directions, as shown. Between the oil conveyers 34, the flange may be provided with slots 35 through which oil may pass inwardly to the spindle. With this arrangement, oil will flow down the conveyers 34 and will pass between the inner ends of the hubs 22 and the side faces of the annular flange 30. It may then enter between the bearing surfaces of the hubs and sleeve and pass outward longitudinally toward the side portions of the pulley into the recesses or pockets 31 and 32. In order that the oil may be returned from these recesses to the interior of the pulley or to the annular oil space in the pulley, I provide oil return openings or passageways 36 which extend from these oil recesses through the hubs 22, being preferably inclined inwardly as shown best in Fig. 2.

In order that the pulley 15 may be lubricated as well as the pulley 14 by the oil supply in the pulley 14, the key way or slot 28 is provided with a fibrous substance 37 such as wicking or waste which by capillary attraction will carry the oil to the bearings for the pulley 15.

The two pulleys are adapted to be shifted into frictional engagement by a combined shifting and braking device 38 consisting of a lever which is pivoted to the bracket 13 by means of a pin 39 and is provided with an arm 40 having a hub 41 in which is a member 42, the position of which may be adjusted by means of a screw 43 and which is provided with a rounded nose or forward end adapted to be pressed against a rounded face of the plug 25 on its diametrical center. Another arm 44 of the lever 38 extends underneath the pulleys and is provided with a friction device 45 adapted to be brought into frictional engagement with the annular surface 18 of the pulley 15 so as to serve as a brake. This brake is normally pressed against the pulley 15 by means of a spring 46 but when the lever 38 is raised, the pulley 14 is shifted into frictional engagement with the pulley 15 and at the same time the brake is released from the pulley 15, but when the lever 38 is released it will return to the position shown in Fig. 1, the pulley 14 being permitted to move away from the pulley 15 and to rotate independently thereof and at the same time the brake being pressed against the pulley 15 so as to stop the same and the parts which are driven through the medium of the belt which engages the pulley 15.

In operation, the pulley 14 may be rotated constantly by the belt and because of the rotation, the oil contained in the pulley will be thrown out to the periphery thereof. However, because of the oil conveyers the oil will be brought to and between the bearing surfaces of the hubs and the sleeve and will flow or work outward longitudinally and pass into the oil recesses provided about the spindle near the side portions of the pulley. Thence the oil will return to the oil chamber from which it was previously taken by the oil conveyers, by means of the oil return openings 36. It will, of course, be impossible for oil to escape from the pulley at the closed end thereof, and it has been found by practice that no oil will escape through the spindle opening or between the spindle and the inner edge of the flange 33. By spacing the inner edge of the flange 33 the proper distance from the spindle, the escape of oil in this manner is prevented, whereas if the inner edge of the flange engaged the spindle oil would be drawn outward longitudinally along the surface of the spindle between the latter and the contacting edge of the flange. A small part of the oil will be absorbed by the wicking or other fibrous substance in the key way and will pass slowly along the same and effectively lubricate the pulley 15. With this construction, the pulley 14 is self-oiling and the pulley 15 is also oiled, but there is no spattering or throwing of oil such as has existed heretofore with most of the self-oiling loose pulleys, and with the power transmitting devices heretofore used.

I do not desire to be confined to the exact details herein shown, but aim in my claims to cover all modifications and arrangements of parts which do not involve a departure from the spirit and scope of my invention.

Having described my invention, I claim:

1. In combination, a spindle, a pair of loose pulleys arranged side by side on the spindle, one pulley being adapted to rotate on the spindle, and the other to rotate and to have a slight longitudinal movement thereon, so that the two pulleys may be brought into frictional engagement, one of the pulleys being a self-oiling pulley, and being provided with an annular chamber which communicates with the bearings of said pulley and constitutes an oil storage inclosure, and means for conveying oil from the chamber of the self-oiling pulley to the bearing of the second pulley.

2. In combination, a spindle, a pair of loose pulleys arranged side by side on the spindle, one of the pulleys being a self-oiling pulley and being formed with an annular chamber which incloses the bearing of said pulley and constitutes an oil storage inclosure; said spindle having a passageway from the pulley constituting the oil storage inclosure to the bearing of the second pulley, whereby the latter may be lubricated by oil supplied from the oil storage pulley and conducted through said passageway to the bearing of said second pulley.

3. In combination, a spindle, a pair of loose pulleys arranged side by side on the spindle, one pulley being adapted to rotate on the spindle and the other to rotate and to have a slight longitudinal movement thereon, so that the two pulleys may be brought into frictional engagement, one of the pulleys being a self-oiling pulley, and being provided with an annular chamber which incloses the bearings of said pulley and constitutes an oil storage inclosure, said spindle having a passageway from the pulley constituting the oil inclosure to the bearing of the other pulley, whereby the latter may be lubricated by oil supplied from the oil storage pulley and conducted through said passageway to the bearing of said second pulley.

4. In combination, a spindle provided with a key-way or slot, a pair of loose pulleys on the spindle, one mounted for rotary movement and the other for rotary movement and a slight axial movement, one of said pulleys constituting an oil inclosure and comprising a rim portion, side portions and hubs projecting inwardly toward each other from the side portions, there being annular oil recesses about the spindle at the sides of the pulley, and oil return openings extending from the recesses through the hubs, and a fibrous substance in the key-way or slot adapted to convey oil from the pulley constituting the oil inclosure to the bearing of the other pulley.

5. In combination, a spindle and a pair of loose pulleys mounted thereon, one of said pulleys being adapted to rotate only on said spindle, and the other being adapted to rotate and to have a slight axial movement thereon, said spindle having a key-way or slot, a bearing sleeve mounted on the spindle, and a key extending through the same into the said key-way, one of the pulleys constituting an oil inclosure and comprising a rim portion, side portions, and hubs projecting inwardly from said side portions and having a bearing on said sleeve, said sleeve having a projecting portion intermediate the hubs whereby the sleeve and pulley will be moved simultaneously in an axial direction, a fibrous substance in said key-way adapted to convey oil from the pulley constituting the oil inclosure to the bearing of the pulley.

6. In combination, a spindle having a key-way or slot and a pair of pulleys, one adapted to be moved into frictional engagement with the other, one of said pulleys constituting an oil inclosure and comprising a rim portion, side portions and hubs which project inwardly toward each other from the side portions, a bearing sleeve mounted on the spindle and having a key engaging said key-way and provided with an outwardly projecting flange between its ends, the hubs of the oil inclosure pulley engaging the sleeve on opposite sides of the flange, there being annular oil recesses or pockets about the spindle at the side portions of the pulley adjacent the ends of the sleeve, and a fibrous substance in said key-way whereby oil is conveyed from said oil inclosure pulley to the bearing of the second pulley.

7. In combination, a spindle provided with a key-way, a sleeve mounted on said spindle, a key carried by the sleeve and engaging in the key-way so that the sleeve may slide axially on the spindle, a pair of pulleys, one mounted on the spindle for rotary movement and the other mounted on the sleeve for rotary movement and adapted to have an axial movement with the sleeve whereby it may be moved into frictional engagement with the other pulley, said rotary and axial movable pulley constituting an oil inclosure and comprising a rim portion, side portions and hubs projecting inwardly toward each other and engaging said sleeve, oil conveyers projecting outwardly from a portion of the sleeve between the hubs toward and adjacent the periphery of the pulley, one side of the pulley being closed and having between said side and the corresponding end of the sleeve an oil recess, and the opposite side of the pulley having a flange extending inwardly beyond the corresponding hub toward the spindle and forming the outer side of an oil recess or pocket, the hubs having oil return openings extending outwardly from said oil recesses or pockets, and a fibrous substance in the key-way and adapted to convey oil from the oil inclosure pulley to the other pulley.

In testimony whereof, I hereunto affix my signature in the presence of two witnesses.

SYLVESTER L. McADAMS.

Witnesses:
 A. F. KWIS,
 A. J. HUDSON.

Copies of this patent may be obtained for five cents each, by addressing the "Commissioner of Patents, Washington, D. C."